Feb. 6, 1962 P. A. CLARK ET AL 3,020,108
ANTI-FRICTION BEARINGS
Filed Aug. 15, 1958 4 Sheets-Sheet 2
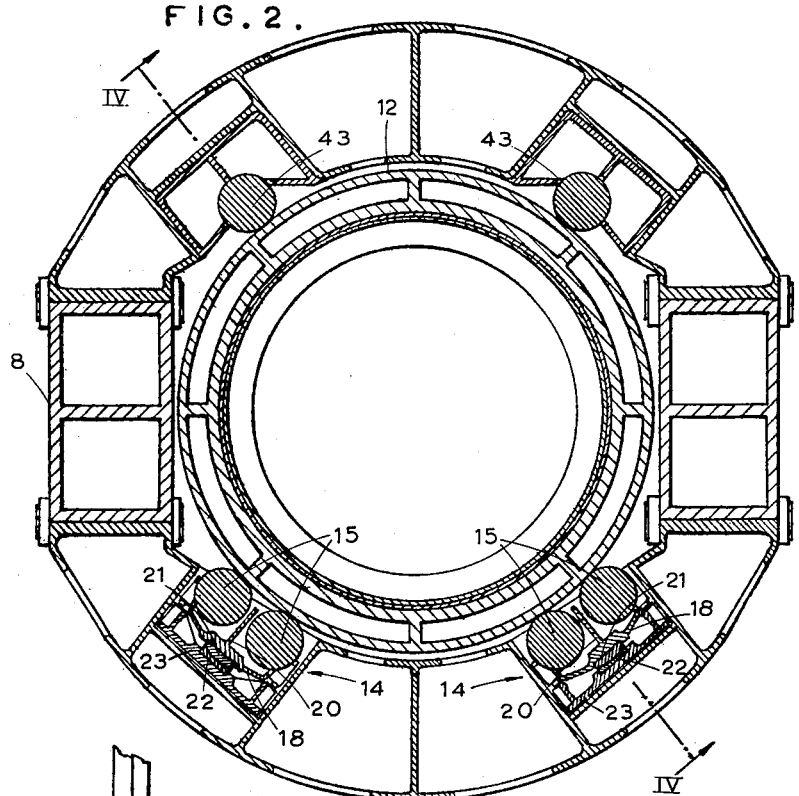
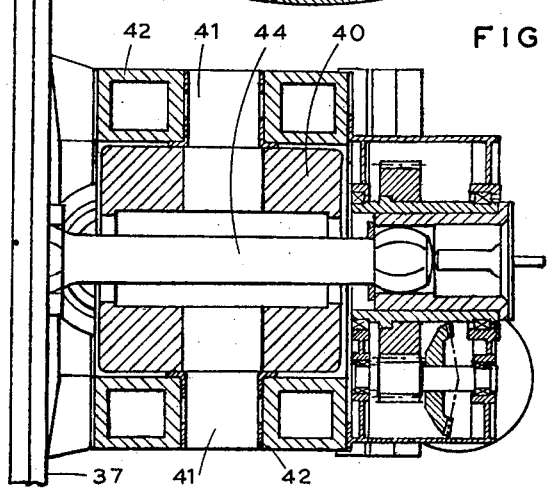
INVENTORS
PATRICK ALWYNE CLARK
DENNIS STUBBS
DENNIS GEORGE BLOOMFIELD
BY Larson and Taylor
ATTORNEY INVENTORS
PATRICK ALWYNE CLARK.
DENNIS STUBBS
DENNIS GEORGE BLOOMFIELD
BY
*Lawson and Taylor*
ATTORNEY

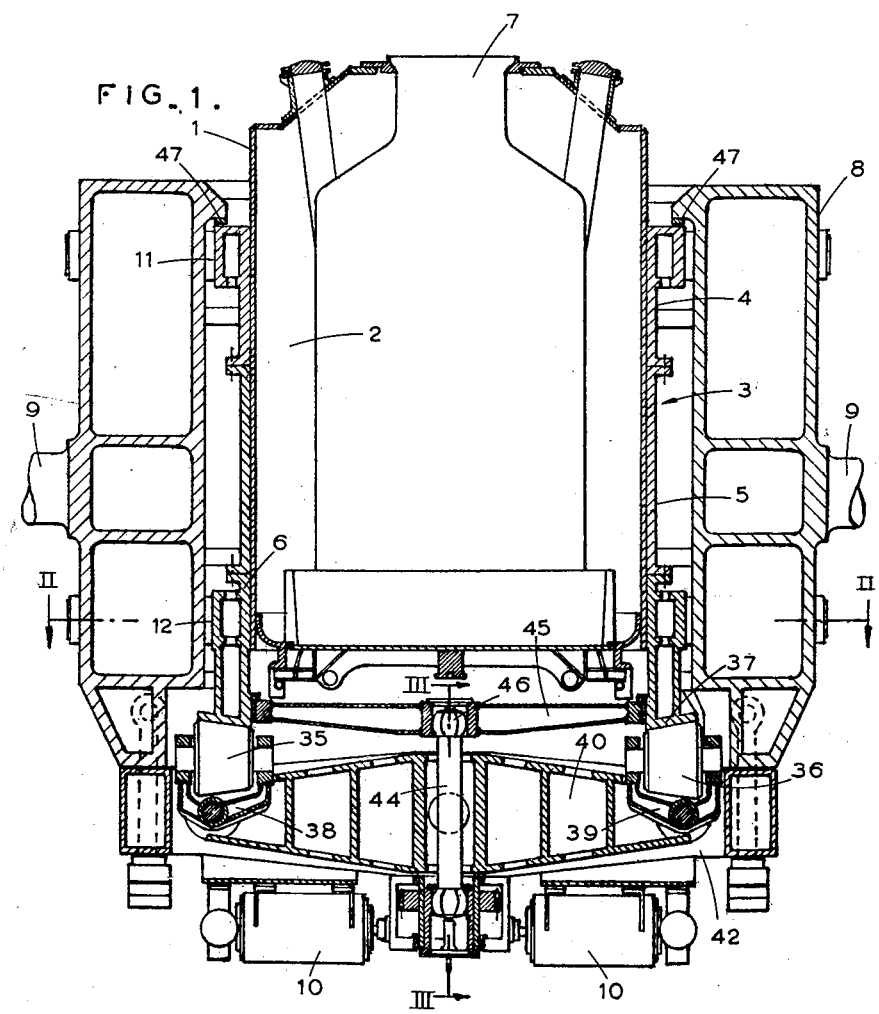

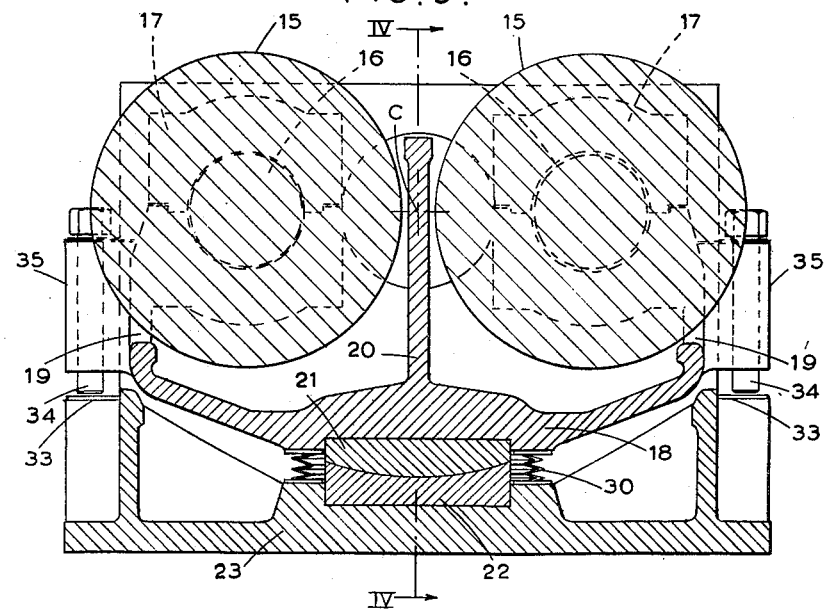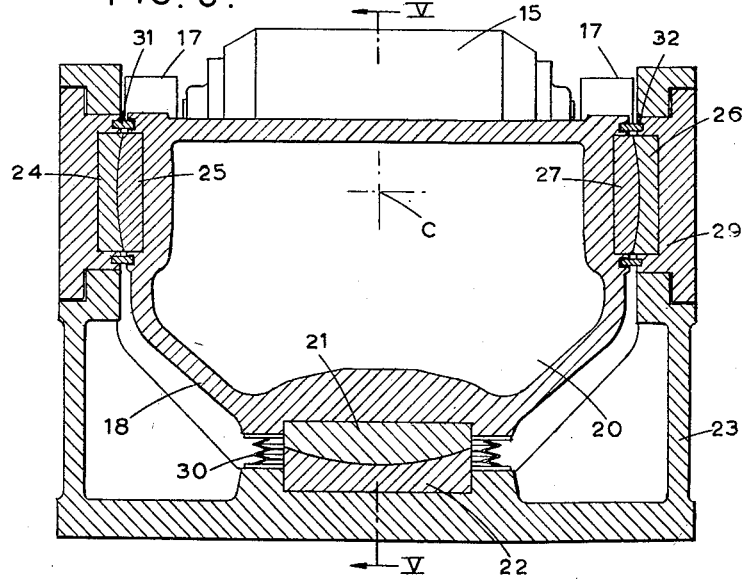

3,020,108
ANTI-FRICTION BEARINGS
Patrick Alwyne Clark, Norton, Sheffield, Dennis Stubbs, Sheffield, and Dennis George Bloomfield, Rotherham, England, assignors to Davy and United Engineering Company Limited
Filed Aug. 15, 1958, Ser. No. 755,285
Claims priority, application Great Britain Aug. 16, 1957
2 Claims. (Cl. 308—203)

This invention relates to anti-friction bearing assemblies and particularly to bearings for tilting rotors; for example, tilting rotary furnaces as used in certain modern methods of converting pig iron to steel. Such a furnace comprises a vessel lined with refractory material, rotatable about a longitudinal axis, formed with an opening at one end, and capable of being turned about an axis at right angles to the axis of rotation, to various operative positions. The vessel (which may include an outer sleeve in which it is detachably fixed) is not, as a rule, required to rotate when in each such position and may be required to rotate in only one of the operative positions, namely, the refining position. Nevertheless, owing to the substantial weight of the vessel, particularly when full, certain problems arise in connection with the supporting means or bearings for the rotary vessel in view of the thermal expansion that takes place in the refining operation and of the substantial redistribution of load that occurs when the vessel is tilted from one position to the next particularly as the tilt has to be communicated to the vessel through the bearings in which it rotates. Moreover, variations due to wear must be readily accommodated. The main object of the present invention is to provide a bearing arrangement that may readily be used for overcoming these difficulties, although it may clearly be applied to many other arts.

According to the invention, therefore, an anti-friction bearing assembly includes a circular track, a cage, at least two rotary elements mounted to rotate about axes that are fixed with respect to the cage, and means supporting the cage so that the rotary elements run on the track when relative rotation between the track and the supporting means takes place, the cage being pivotally mounted on the supporting means so as to be capable of rocking about a center fixed with respect to the supporting means. The rotary elements may be independent of one another except insofar as they are carried by a common cage. Alternatively they may be driven by a motor mounted on the cage. When the rotary elements are arranged to run on the periphery of an annular track, their axes are parallel and advantageously there are just two rotary elements in the cage. Then the cage may be mounted to rock in any direction about the center and the rotary elements may be constituted by two rollers, each making line contact with the track.

When the invention is applied to a rotary furnace or other rotary vessel, the vessel may be furnished with one or more annular tracks about which, or each of which, are distributed at least two anti-friction bearings, each consisting of cages carrying rollers as aforesaid. Then the cages are mounted in a common frame which in turn is mounted to tilt so as to alter the angle of elevation of the axis of the vessel. With this arrangement the vessel may be arranged to tilt to a position in which the rotor tends to slide off the anti-friction bearings so that it is desirable to provide rollers at one end to limit the axial movement of the vessel. Moreover, the vessel may be arranged to tilt to and beyond the vertical position so that it is convenient, in the event of the vessel only being intended to be positively rotated when in contact with the anti-friction bearings, to arrange the vessel to bear against more simple bearings, such as simple rollers or pads, when tilted beyond the vertical.

In order that the invention may be clearly understood and readily carried into effect, constructions in accordance therewith will now be described, by way of example, with reference to the accompanying drawings, in which:

FIGURE 1 is a vertical section through a rotary furnace, shown in the upright position;

FIGURE 2 is a cross-section on the line II—II in FIGURE 1, the furnace being shown in the horizontal position;

FIGURE 3 is a section, on an enlarged scale, taken on the line III—III in FIGURE 1;

FIGURE 5 is a sectional elevation of a detail of the construction of FIGURES 1 to 4, the section being taken on the line V—V in FIGURE 6;

FIGURE 6 is a section on the line VI—VI in FIGURE 5; and

Figure 4:
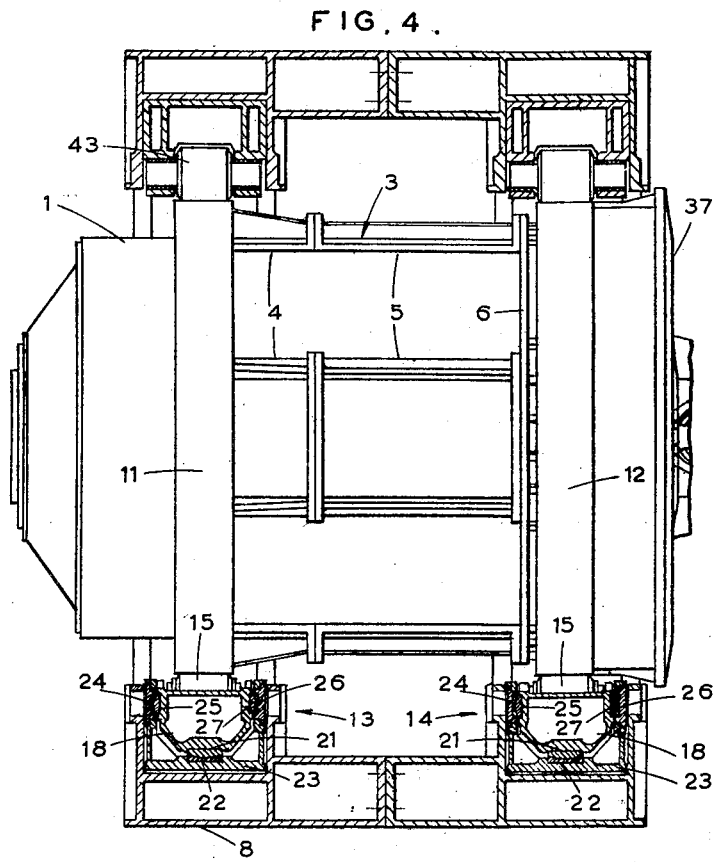
FIGURE 4 is a section on the line IV—IV in FIGURE 2.

In the construction of FIGURES 1 to 6 the furnace includes a steel cylindrical vessel 1 lined with refractory material 2 and detachably mounted in a sleeve 3 divided into three sections 4, 5, 6, the section 5 consisting of four discrete spacers circumferentially arranged and fixed to mating portions of the sections 4, 6. The vessel is closed at its lower end, as viewed in FIGURE 1, and is formed with an axial mouth or opening 7 at its upper end. The vessel unit 1, 2, 3 is mounted to rotate about its axis in a cylindrical frame 8 that embraces most of the length of the vessel. The frame 8 is mounted to tilt on horizontal trunnions 9, mounted in fixed bearings (not shown) that lie on an axis which intersects the axis of the vessel unit a little more than a quarter of the way along the vessel from its closed end. A motor (not shown) acting through appropriate mechanism is arranged to tilt the frame 8 and vessel unit 1, 2, 3 to the various operative positions, which include the charging position in wich the vessel axis includes an angle of 10° of arc with the horizontal, a refining position in which this angle is increased to 15°, 20′, a slagging position which is 10° below the horizontal, and a sampling position in which the vessel axis is horizontal, all these positions being such that the mouth of the vessel is on the same side of the vertical. There is also a tapping position in which the vessel is swung through 190° from the horizontal position and over the vertical position, and also a position in which the vessel is inverted with its axis vertical for the clearance of residual material and for the removal of the vessel 1. At least in the refining position, the vessel unit 1, 2, 3 is rotated about its axis by two motors 10 carried by the frame 8 and acting through mechanism described below.

The vessel is furnished with two circumferential and similar tracks 11, 12 forming portions of the aforesaid sections 4, 6 and respectively located fairly close to the ends of the vessel 1. When the vessel is in the refining position and in the other positions close to the refining position, each of these tracks 11, 12 rests on two anti-friction bearings 13 or 14. The two anti-friction bearings in each pair 13 or 14 are displaced from one another by about 80° of arc about the axis of the frame 8 and they are displaced by equal amounts on opposite sides of the vertical plane through the axis. Each anti-friction bearing includes two parallel rollers 15 of uniform cross-section. The rollers have trunnions 16 which are mounted in bearings 17 in opposite walls of a cage 18 through the open top of which substantial arcs of the rollers 15 project, the exposed portions of the rollers making contact with the track 11 or 12.

The trough or cage 18 has a larger dimension circumferentially of the vessel, that is to say, in the direction at right angles to the roller axes, than in the direction parallel to the roller axes, although, while the trough accommodates the complete length of the rollers 15, gaps 19 are formed in the side walls of the trough through which the diametrically opposite side arcs of the two rollers project. The two rollers are spaced closely together, but a web 20 at right angles to the plane containing the roller axes projects upwards from the bottom of the trough 18 to a point just above that plane, so as to strengthen the trough 18.

Mounted centrally at the bottom of each trough 18 is a circular bearing member 21 presenting a spherical convex bearing surface that mates with a spherical concave surface in a circular bearing member 22 carried by a support 23. The concave member 22 has an axis which intersects the axis of the frame 8 at right angles and the said support 23 is fixed in a compartment in the frame 8. The centre C of the two spherical surfaces on the members 21, 22 lies in the plane containing the roller axes, mid-way between the axes and at equal distances from the ends of the rollers.

The cage or frame is further located by two additional pairs of spherical bearings 24, 25 and 26, 27. In these, the two concave members 24, 26 have a common axis parallel to the roller axes and intersecting the centre C of the first mentioned spherical surfaces on the members 21, 22. The radii of all three pairs of spherical surfaces are equal and their curvature is the same. The two additional pairs of spherical bearings 24, 25 and 26, 27 have their convex members 25, 27 fixed outside the walls of the cage and their concave members 24, 26 fixed to detachable portions 28, 29 of walls forming parts of the aforesaid support 23.

It will be seen that the spherical bearings permit the pair of rollers 15 to tilt about a parallel central axis through the centre C between the rollers 15 so as to ensure that they are always both in contact with the track 11 or 12, in spite of irregularities in the track due to inaccuracies in manufacture, thermal expansion and uneven loading. Moreover, the spherical bearings permit the rollers 15 to tilt about an axis at right angles to the central axis, that is to say, about the horizontal axis through the center C as viewed in FIGURE 5, so as to ensure that their full lengths are as far as possible in contact with the track 11 or 12 and to accommodate changes due to thermal expansion and to the redistribution of load due to tilting.

The pair of spherical surfaces are grease lubricated. Thus, the space around the bearing members 20, 21 is sealed by bellows 30 to retain the grease, the bellows being sealed above (as viewed in FIGURES 5 and 6) to the cage or trough 18 and below to the support 23. To retain the grease around the pairs of bearing members 24, 25 and 26, 27 flexible cylinders 31, 32 are interposed between the wall portions 28, 29 and the trough 18.

It will be appreciated that only a very small rocking movement in any plane is required for the trough 18, the main tilting plane being about the axis C as viewed in FIGURE 5 and this is limited by stops 33 on the support 23 which are engaged by bolts 34 adjustable in ears 35 on the cage 18. It will be appreciated that in all positions within the range of movement of the trough 18, the resultant line of thrust between the track and rollers 15 substantially passes through the center C.

When the frame 8 is tilted upwards towards the vertical position (FIGURE 1) the end of the vessel unit 1, 2, 3 rests on two tapered rollers 35, 36 which bear against a mating conical track 37 at the bottom of the sleeve section 6. The rollers 35, 36 are carried by rockers 38, 39 pivoted to the ends of a beam 40 which, in turn, is pivoted on trunnions 41 in a transom 42 forming part of the frame 8. The axis of the trunnions 41 intersects and is perpendicular to the axis of the frame 8, but at right angles to the axis of the trunnions 9 about which the frame tilts, this arrangement being described in detail in the specification of our co-pending U.S. application Serial No. 755,286, filed August 15, 1958.

When the frame 8 has been tilted beyond the vertical position, the clearance is such that the tracks 11, 12 part company with the four anti-friction bearings 13, 14 to a very small extent and bear against four simple rollers 43 mounted in the frame 8 at points diametrically opposite the four anti-friction bearings 13, 14.

The two motors 10 for driving the vessel unit 1, 2, 3 are carried by the transom 42, which extends diametrically across the closed end of the vessel 1. The drive is transmitted axially to the vessel unit 1, 2, 3 by a shaft 44 that is universally mounted at each end and transmits the drive to the center of a spider 45 fixed to the sleeve section 6. There is a splined sliding connection 46 between the shaft 44 and the spider 45 so that when the vessel is inverted the axial load is not transmitted to the shaft 44, the vessel then resting on pads 47 at the remote end of the frame 8.

Figure 7:
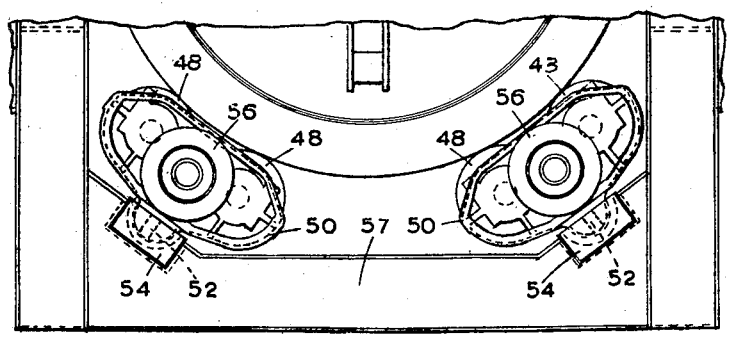
FIGURE 7 is an end elevation of a portion of a modified construction.

Referring to the modification of FIGURE 7 it will be seen that the tracks run on pairs of rollers 48 mounted in troughs 50 having spherical protuberances 52 that mate with spherical bearings 54. In this modification, instead of the shaft 44 and motors 10, a friction drive is provided because the rollers 48, 49 are driven by electric motors 56 mounted on the troughs 50 and connected to the rollers 48 by reduction gearing. The spherical bearings 54 are carried by a frame 57 arranged to tilt in the same way as the frame 8 of FIGURES 1 to 4.

We claim:

1. A rotary furnace assembly including, in combination, a frame mounted to tilt about a substantially horizontal axis, a refractory furnace vessel, bearing means in said frame for supporting said vessel so as to rotate about a central axis through said vessel at right angles to said first-mentioned axis, said vessel being formed coaxially with two peripheral cylindrical tracks and with one circular end track, and said bearing means including four cages mounted for universal movement respectively about four separate centers fixed with respect to said frame, two cages beneath each cylindrical track when said vessel is lying horizontally, and two cages on each side of the vertical plane containing the vessel axis, four pairs of parallel rollers allocated respectively to said cages to rotate about axes fixed therein while running on said cylindrical tracks, two diametrically opposed rockers, mounted to rock about axes substantially at right angles to the axis of rotation of said vessel, two end thrust rollers mounted to roll on said end track and mounted respectively in said rockers to rotate therein about axes respectively perpendicular to the rocker axes, and supporting mechanism for said rockers, said supporting mechanism being mounted on said frame and adapted to permit one of said rockers to move in a direction slightly away from said first-mentioned axis, about which said frame tilts, while the other rocker moves an equal distance towards said first-mentioned axis.

2. A rotary furnace according to claim 1 comprising also at least two electric motors mounted respectively on two of said cages, each said motor being adapted to rotate both the rollers in its respective cage about their axes.

References Cited in the file of this patent

UNITED STATES PATENTS

| 760,941 | Wilson | May 24, 1904 |
|---|---|---|
| 974,964 | Helbig | Nov. 8, 1910 |
| 2,029,717 | Heinze | Feb. 4, 1936 |

FOREIGN PATENTS

| 20,853 | Australia | June 24, 1929 |
|---|---|---|
| 776,962 | Great Britain | June 12, 1957 |